June 11, 1968     T. W. WINSTEAD     3,387,328
EXTRUSION APPARATUS
Filed July 29, 1965     2 Sheets-Sheet 1
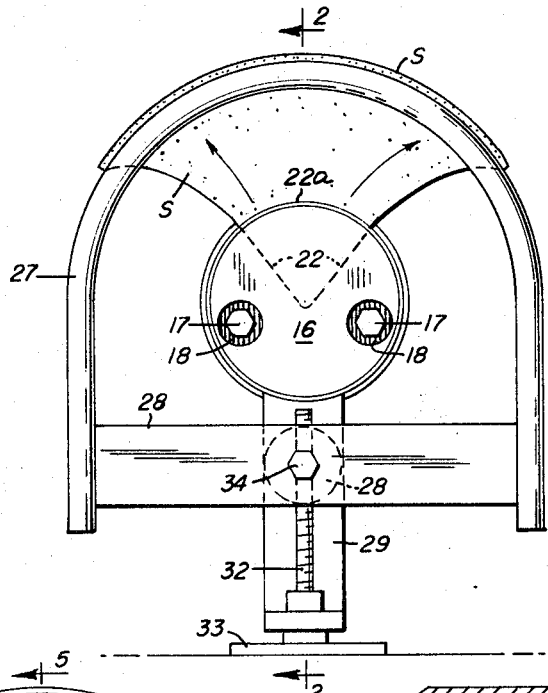
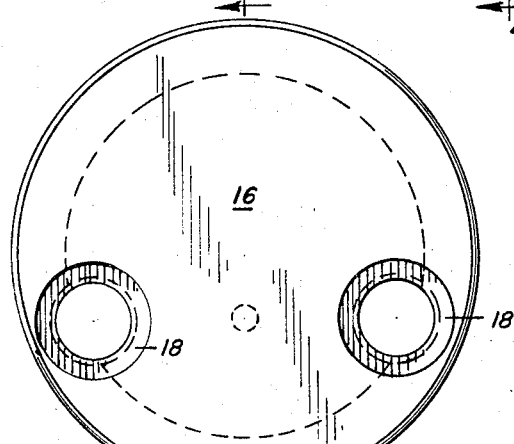
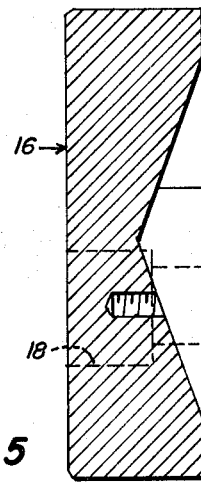
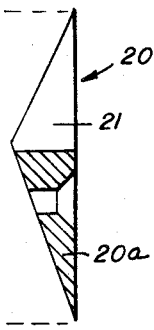
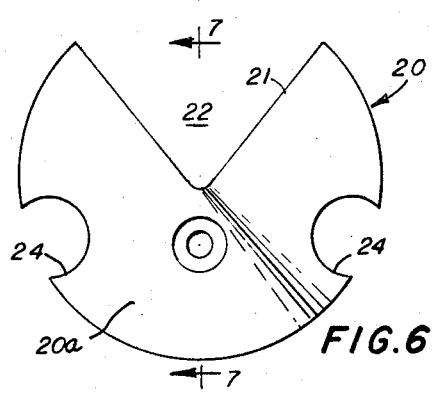
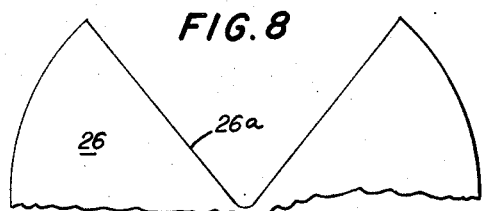
INVENTOR
THOMAS W. WINSTEAD
BY Raphael Semmes
ATTORNEY June 11, 1968
T. W. WINSTEAD
3,387,328
EXTRUSION APPARATUS
Filed July 29, 1965
2 Sheets-Sheet 2
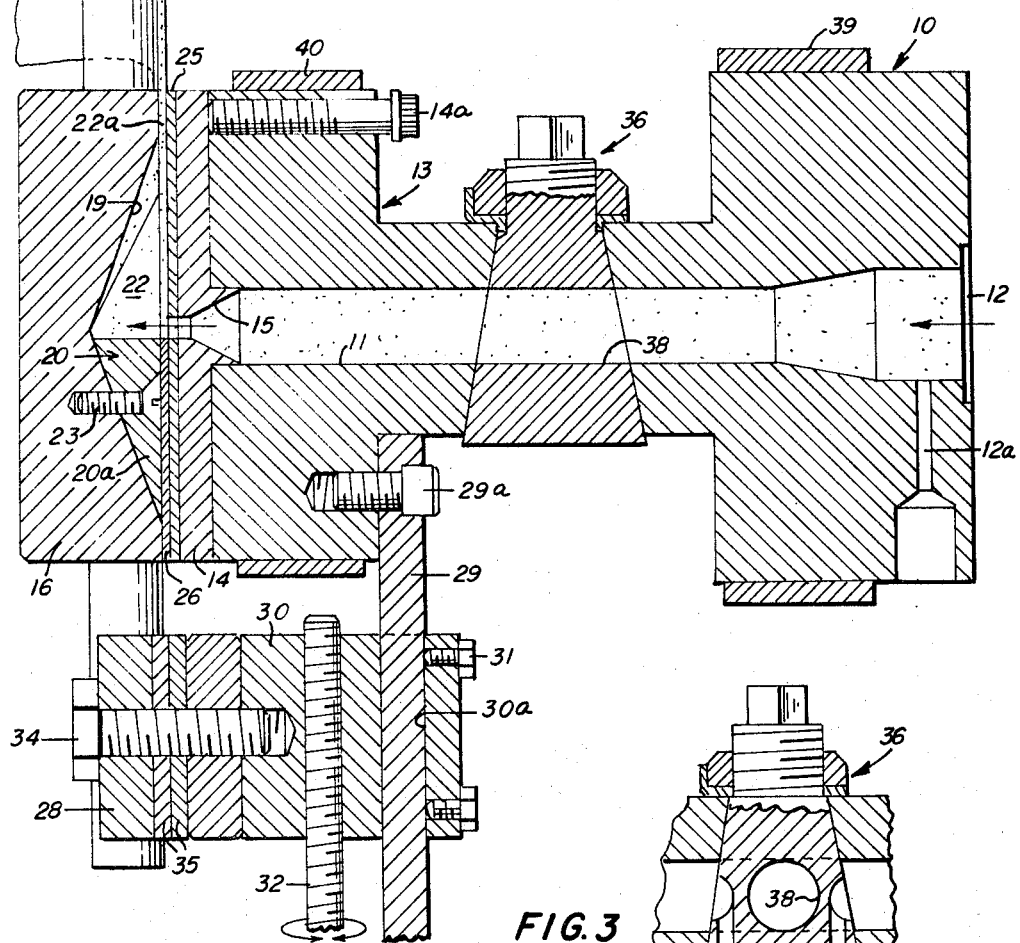
INVENTOR
THOMAS W. WINSTEAD
BY Raphael Semmes
ATTORNEY United States Patent Office 3,387,328
Patented June 11, 1968

3,387,328
EXTRUSION APPARATUS
Thomas W. Winstead, Baltimore, Md.
(Williamson Lane, Cockeysville, Md. 21030)
Filed July 29, 1965, Ser. No. 475,734
9 Claims. (Cl. 18—12)

ABSTRACT OF THE DISCLOSURE

Apparatus for forming foamed plastic sheets wherein an expandible thermoplastic strip is first extruded in a radial path through an extrusion head having a fan-shaped feed reservoir bounded by an arcuate extrusion orifice. All points along this orifice are equidistant from the axis of the feed reservoir so as to provide uniform and uninterrupted distribution of pressure flow along the die lips. Adjacent the die orifice an arcuate spreading yoke, which is substantially concentric with the arcuate die lips, underlies the expanded extruded strip to provide maximum accommodation of the widthwise expansion thereof and prevents the formation of wrinkles and eliminates strains.

---

This invention relates to extrusion apparatus and consists more particularly in new and useful improvements in apparatus for the extrusion and spreading of foamed or cellular thermoplastic materials into a smooth continuous sheet.

These foamed thermoplastics may include polyvinylchloride, polystyrene, polyethylene and polypropylene as the basic material to be extruded, and ordinarily volatile liquids, such as pentane, trichlorofluoromethane, or other suitable materials which are somewhat soluble in certain thermoplastics, are added to the charging stock. This liquid material will remain in the liquid phase under certain temperatures and pressures, and when the pressure is reduced, the liquids form a gas which, when extruded, causes the thermoplastic material to foam. Sometimes gases, such as nitrogen or carbon dioxide, are used instead and are injected under pressure into the extrusion system.

When foamed plastics are extruded from a conventional die having lips which lie in a flat plane, the resulting extrudate immediately expands upon emergence from the die lip or orifice, and because of the foaming action, this expansion is three-dimensional, i.e., an expansion in length, width and thickness of the sheet, the degree of expansion depending fundamentally upon the resulting density of the material. For example, in extruding a resin which has an original density of 60 lbs. per cubic foot, and by the addition of cells this density is reduced to 3 lbs. per cubic foot, the extrudate expands considerably in all three dimensions as it emerges from the die.

In this particular example, the extrudate would actually grow approximately 2.7 times in each dimension. The growth in length and thickness of the extrudate is actually of no particular concern since the rate of longitudinal expansion can be compeisated for by regulating the take-off speed and the thickness of the sheet is relatively small to begin with. However, the width dimension which is relatively wide must expand 2.7 times its original dimension, which brings about a considerable problem. For example, if the extrudate is 3 inches wide at the point of emergence from the die lip, the sheet, after expansion, is over 8 inches in width. Of course, at the center line of the die orifice, there is no particular problem, since this point continues on the center line as the material expands and is taken off. However, each of the edges of an extruded sheet fed from the orifice in a conventional flat lipped die must move rapidly from a point 1½ inches from the center line to a point over 4 inches from the center line.

Since most of the expansion in a cellular material occurs very close to the die orifice, the geometry of suitable apparatus to cope with this wide lateral expansion problem is very important and critical. If this expansion is not properly accommodated, the extrudate will tend to corrugate or wrinkle, which will result in poor quality or an unuseful product. Where a flat strip or sheet is desired in order to accommodate subsequent processing requirements, such as molding, the need of some apparatus to compensate for problems such as that above referred to becomes of utmost importance.

In tubular extrusion, the wrinkling or corrugating problem is controlled to some degree by the "bubble method." As the tube emerges from the die orifice, it is expanded by internally trapped air or sometimes an internal shoe is employed which helps to remove the wrinkles or corrugations. However, even this method has definite limitations with very low density materials and is not applicable for the high speed extrusion of strips or sheets requiring subsequent operations close to the die oriffice where the extrudate is still sufficiently pliable for such operations. As cellular materials expand upon emerging from a die orifice, they cool rapidly, and if subsequent operations are to be performed, they must be performed immediately after emergence from the die lip.

It is therefore the primary object of the present invention to overcome the disadvantages inherent in conventional flat lipped extrusion apparatus where foamed thermoplastic materials are to be extruded.

Another object of the invention is to provide an apparatus of this kind designed geometrically to produce the maximum possible widthwise accommodation of expansion.

Another object of the invention is to provide an extrusion apparatus for foamed thermoplastics which insures a uniform distribution of pressure-flow at all points along the die lip and thereby eliminates strains or distortions in the extrudate.

A further object of the invention is to provide in association with an extrusion die, such as above referred to, a mandrel or speading yoke for the extruded sheet material, the geometry of such mandrel affording the maximum accommodation of the widthwise expansion relative to time.

Another object of the invention is to provide apparatus for extruding expandable thermoplastic strips so as to accommodate the maximum widthwise expansion of the extrudate and prevent formation of wrinkles thereon.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is an end view of the extrusion die and mandrel showing an extruded sheet of foamed thermoplastic passing over the mandrel;

FIG. 2 is an enlarged sectional view taken on line 2—2 of FIG. 1;

FIG. 3 is a sectional detail of the valve shown in FIG. 2;

FIG. 4 is a plan view of the end cap of the extrusion die head;

FIG. 5 is a sectional view taken on line 5—5 of FIG. 4;

FIG. 6 is a plan view of the internal adaptor for the extrusion die;

FIG. 7 is a sectional view taken on line 7—7 of FIG. 6; and

FIG. 8 is a plan view of a shim which is interposed between the end cap and die lip.

Briefly, the invention involves an extrusion apparatus which is basically of a more or less conventional nature, but which, instead of utilizing a die having the usual flat die face, embodies a die lip arrangement wherein the discharge slot or orifice is arcuate in shape and is fed from a feed chamber which diverges from a substantially central inlet point to the arcuate die lips. This arrangement provides a uniform distribution of pressure-flow at all points along the lip of the die and thereby eliminates strains or distortions in the extrudate which, as before pointed out, is not possible with the conventional flat surface die.

Referring first to FIG. 2 of the drawings, 10 represents an extruder body having a longitudinally extending central passageway 11 fed at one end 12 from a suitable source of molten plastic (not shown). The opposite end of the passageway or barrel 11 passes through an extruder head 13 and preferably terminates in communication with a converging inlet port 15 located centrally of a circular, flexible die lip 14.

An end cap 16, also circular in shape, registers with the flexible die lip 14 and is secured in place on the head 13 by means of bolts 17 which, as best seen in FIG. 1, are inset in recesses 18 in the end cap 16, and extend into the head 13 through registering openings in the die lip 14. The inner face of the end cap 16, as seen in FIG. 5, is conically recessed as at 19, providing a feed chamber which is coaxial with the passageway 11 and opening 15. This chamber has diverging side walls which terminate in slightly axially and inwardly spaced relation to the periphery of the end cap 16.

An adaptor 20, shown in detail in FIGS. 6 and 7, conforms substantially to the surface contour of the chamber 19, with the exception that the upper portion thereof is provided with a V-shaped cutout area 21 which, when the adaptor is installed concentrically within the chamber 19, provides the diverging radial confines of a substantially fan-shaped plastic feeding reservoir 22 of which the upper portion of the circular lip 14 forms the opposite wall. This reservoir terminates outwardly in an arcuate extrusion orifice 22a. As will be seen in FIG. 2, with the exception of the V-shaped cutout area 21, the remainder of the adaptor is solid, as at 20a, and is secured to the end plate by suitable bolts or screws 23. The adaptor is also provided with openings 24 (FIG. 6) to accommodate the bolts 17 which secure the end plate to the head.

Thus, as seen in FIG. 1, all points along the arcuate extrusion orifice 22a are equidistant from the axis of the fan-shaped feeding reservoir 22 adjacent the inlet port 15 so as to provide a uniform, uninterrupted distribution of pressure flow at all points along the extrusion orifice, as indicated earlier.

Although not essential, a circular washer 25 overlies the face of the flexible die lip 14, and interposed between the washer and the adjacent face of the end cap 16 and adaptor 20, a shim 26 is provided. As seen in FIG. 8, this shim is shaped generally the same as the adaptor 20, having a V-shaped cutout area 26a which registers with the cutout area 21 of the adaptor. However, the shim is of a diameter similar to that of the end cap and extends beyond the radial confines of the adaptor.

Thus, when in place, the boundaries of the cutout area 26a of the shim actually control and define the arcuate length of the die opening 22a which generally incorporates an angle less than 180°.

To facilitate the control of the extrudate after leaving the die lips, a mandrel or spreading yoke 27 is provided adjacent the die lips. This mandrel preferably comprises a vertically disposed, transversely arcuate tube mounted on a cross-bar 28 which is adjustably supported on an upright standard 29 by an adjusting head 30, the upper end of the standard being connected to the extruder head assembly 13 by a bolt or bolts 29a. The adjusting head 30 is provided with a vertical slot 30a which slidably embraces the upright 29, set screws 31 being provided to firmly secure the head 30 in its vertically adjusted position. This adjustment is effected by a vertical adjusting screw 32 which engages complementary threads in the head 30, said screw having adjusting knob 33. Any suitable means may be employed for rotating the adjusting screw. Thus, the head 30 may be moved up or down on the standard 29 and, with it, the cross-bar 28 and the mandrel 27.

A rotary adjustment may be effected by means of an adjusting bolt 34 which passes laterally through the cross-bar 28 and engages threads in the adjusting head 30. Suitable braking or friction discs 35 may be interposed between the cross-bar 28 and the adjusting head assembly to assist in retaining the rotary adjusted position of the mandrel to either one side or the other of the extrusion lips.

As best seen in FIG. 2, the arcuate yoke or mandrel is preferably located in approximately the same plane as the die lip orifice 22a and is radially spaced from said orifice by a distance which is calculated to accommodate the transverse expansion of the extruded strip after it leaves the orifice.

Preferably, the mandrel 27 is in the form of a tube to accommobate the passage of a cooling fluid to prevent sticking of the extrudate as it passes over the mandrel. As a further means to prevent sticking, the surface of the mandrel may be coated with a suitable non-sticking material, such as polytetrafluoroethylene.

In order to enable the operator to change die parts without stopping the extrusion equipment feeding the die, a valve 36 is provided in the extruder body to control the flow through the passageway or barrel 11, the valve port 38 being shown in open position in FIG. 2. The closed position of the valve is shown in FIG. 3 where the valve acts as a by-pass valve which, when rotated, bleeds all material entering the die body 10 through the bottom orifice 37 of the valve, while closing off the normal passage through the regular port 38. This feature makes it possible to remove the head bolts 17 so that the shim 26 and the adaptor 20 may be replaced with shim and adaptors of different sizes in order to produce a wider or narrower sheeting. After the end cap is replaced and the new shim is in place, the valve is then turned 90° and the through-flow is restored.

It may also be desirable to provide supplemental band heaters 39 and 40 of any suitable design, surrounding the inlet and outlet ends of the die body 10, as shown in FIG. 2. 12a is a pressure gauge port.

In operation, molten plastic woth a dissolved foaming agent, such as pentane, is fed from any conventional source into the inlet end 12 of passageway 11 under pressure. The foaming agent ultimately causes the foaming of the thermoplastic charging stock. Until the pressurized thermoplastic material emerges from the die orifice 22a, the material remains in liquid phase. However, immediately upon emerging from the die lips or orifice, the release of pressure on the extrusion stock causes the extruded sheet S to undergo a three-dimensional expansion, as previously indicated, and due to the diverging walls of the chamber 19 and the coacting V-shaped recesses 21 in the adaptor 20 and 26a in the shim 26, a uniform distribution of pressure-flow is effected at all points along the arcuate lip, which thereby eliminates strains or distortions in the extrudate. As the extrudate emerges from the die lips and expands, it continues to move radially out to the mandrel or spreader 27, and the geometry of this spreader provides the maximum possible accommodation of the widthwise expansion relative ot time. The strip S is then passed over the mandrel and may be drawn away at an oblique or acute angle with respect to the plane of the mandrel.

If the mandrel is arcuate, concentric to the arcuate die opening, it is not necessary to take the extrudate away from the mandrel at more than a 90° angle to the plane formed by the mandrel. However, if the take-away angle is less than 90° and becomes acute wtih respect to the plane of the mandrel, that is, more nearly parallel, the shape of the mandrel may then be formed other than concentric, either by making it elliptical in shape rather than arcuate, or by moving its center line closer to the die opening, which effectively does the same thing. In practice, it has generally been found best to draw the strip or sheet S away from the mandrel in a direction almost parallel to the plane of the mandrel, which is approximately 180° in the opposite direction from which the extrudate flows from the die opening to the mandrel. In the space between the arcuate die orifice and the mandrel, the corrugations or wrinkles of an expanding cellular sheet are very efficiently and quickly removed. Optimum efficiency is achieved when the rate of lateral expansion of the extrudate coincides with the rate of flow between the die orifice and the mandrel; when this condition is achieved no wrinkles or corrugations even begin to form.

As previously pointed out, the die lip 14 is flexible and adjustable. The die lip may be deflected by adjusting screws 14a. The thickness of the die lip 14 is chosen to provide whatever degree of local flexibility may be required for local displacement by the adjusting screws. The thicker this lip, the less localized will be the effect of deflection by the adjusting screw. If more local deflection is required, the die lip 14 would be made thinner or it would be made up of a lamination of several pieces rather than a single piece in order to provide flexibility. If less deflection is desired, the flexible lip 14 may be made thicker and actually would reduce the number of adjusting screws required. It will be noted that the adjusting screws are positioned so as to be accessible from the rear of the die where they do not interfere with the extrudate as it passes in front of the die, having completed its circuit over the mandrel.

From the foregoing, it is believed that the invention may be readily understood by those skilled in the art without further description, it being borne in mind that numerous changes may be made in the details disclosed without departing from the spirit of the invention as set forth in the following claims.

I claim:

1. In apparatus for extruding an expanding sheet of foamed thermoplastic material, the combination of a die head assembly having a plastic feeding passageway, an extrusion chamber in said die head having an unobstructed feeding reservoir, a feed opening in said reservoir communicating with said passageway and terminating at its discharge end in an elongated, transversely arcuate, unobstructed die orifice, opposite side walls of said reservoir diverging from said feed opening to the extremities of said arcuate die orifice, whereby the extrudate from said orifice is directed for expansion in a radiating path, and a spreading yoke of arcuate contour adjacent said die, the surface of said spreading yoke lying in an arcuate plane substantially concentric with but radially spaced beyond the arcuate die orifice and adapted to underlie and spread the extrudate from said orifice, providing the maximum possible accommodation of the widthwise expansion of the extruded sheet.

2. Apparatus as claimed in claim 1, wherein said extrusion chamber is bounded by a rear wall which converges from a point adjacent the axis of said plastic feeding passageway toward said orifice.

3. Apparatus as claimed in claim 1, wherein said extrusion chamber is substantially conical, the radial extremity of at least the upper portion of its rear wall partially defining said extrusion orifice, an adaptor insertable in said chamber, contoured to substantially fill the lower portion of the latter and to define diverging side walls for said reservoir which terminate adjacent said orifice.

4. Apparatus as claimed in claim 1, including means for rotatably adjusting the relationship of said spreading yoke with respect to said die orifice.

5. Apparatus as claimed in claim 4, including means for adjusting said yoke toward and away from the axis of said arcuate die orifice.

6. In apparatus for extruding sheets of foamed thermoplastic material, a die assembly comprising a main body, a plastic feeding passageway extending longitudinally through said body, a die head at one end of said body, a first die lip secured to said die head in radial relation to said passageway, an end cap secured to said die head with its inner face adjacent to but longitudinally spaced from said first die lip to thereby form a complementary second die lip, an extrusion chamber in said end cap having an inlet port communicating with said passageway, said chamber being bounded by a rear wall which converges from a point adjacent the axis of said plastic feeding passageway toward said die lips and by side walls which diverge from said axis toward said die lips, said end cap being provided with a substantially conical recess which is concentric with said feeding passageway, and an adapter insertable in said recess and contoured to define said diverging side walls of said chamber the extrusion orifice between said spaced die lips being transversely arcuate with respect to said die head, whereby the extrudate from said chamber is extruded radially in a diverging path.

7. In apparatus for extruding an expandable thermoplastic strip, a die head assembly having an extrusion chamber therein, a plastic feeding inlet leading into said chamber, and a transversely arcuate die orifice communicating with said chamber, said die being devoid of diversions of flow, and a spreading yoke of arcuate contour substantially concentric with the axis of said arcuate die orifice, located in substantially the same plane as said orifice and radially spaced therefrom a distance which is calculated to accommodate the transverse expansion of said strip after it leaves said orifice.

8. Apparatus as claimed in claim 1, wherein said spreading yoke is tubular to accommodate the passage of a cooling fluid through the yoke.

9. Apparatus as claimed in claim 1, wherein said feeding passageway is provided with a valve and bleeder, upstream from the die orifice for diverting flow from the latter during adjustment of the die.

References Cited

UNITED STATES PATENTS

| | | | |
|---|---|---|---|
| 2,628,386 | 2/1953 | Tornberg | 18—12 |
| 2,668,324 | 2/1954 | Johnson | 18—14 |
| 2,774,106 | 12/1956 | Bethe | 18—12 X |
| 2,779,053 | 1/1957 | Longstreth et al. | |
| 2,952,872 | 9/1960 | Beteux et al. | 18—14 |
| 3,074,108 | 1/1963 | Wiley et al. | 18—14 |
| 3,145,419 | 8/1964 | Reifenhauser | 18—12 |
| 3,193,879 | 7/1965 | Corbett | 18—14 |
| 3,197,815 | 8/1965 | Van Riper | 18—12 |
| 3,258,516 | 6/1966 | Ewing | 18—14 X |

WILLIAM J. STEPHENSON, *Primary Examiner.*